United States Patent Office 3,496,098
Patented Feb. 17, 1970

3,496,098
PROCESS FOR DESULFURIZING AND DEODORIZING HYDROCARBONS, ESPECIALLY HYDROCARBON OILS
Wilfried Rothe, Sprendlingen, Germany, assignor to Deutsche Gold- und Silber-Scheideanstalt vormals Roessler, Frankfurt am Main, Germany
No Drawing. Filed Feb. 23, 1967, Ser. No. 617,843
Claims priority, application Germany, Feb. 26, 1966, D 49,446
Int. Cl. C10g 19/00
U.S. Cl. 208—230    5 Claims

ABSTRACT OF THE DISCLOSURE

Process for the desulfurization of hydrocarbon vapors with at least one finely divided sodium compound selected from the group consisting of sodium monoxide and sodium hydride supported on a mixed carrier essentially consisting of an alkaline earth metal oxide, preferably, CaO, and carbon, preferably, graphite, the ratio of oxide to carbon being between 1:0.2 and 1:5 by weight.

BACKGROUND OF THE INVENTION

Field of the invention

The invention relates to an improved process for desulfurizing and deodorizing hydrocarbons, especially, oils, by treatment with sodium monoxide or sodium hydride.

Description of the prior art

According to German Patent 1,148,679 and U.S. Patent 3,160,580, hydrocarbons can be deodorized and desulfurized by passage in the vapor phase over finely divided sodium oxide or sodium hydride. The raffinates thus obtained, however, still have sulfur contents betewen 2 and 5 p.p.m.

SUMMARY OF THE INVENTION

The present invention concerns an improvement in the desulfurizing and deodorizing processes concerned in German Patent 1,148,679 and U.S. Patent 3,160,580 in that it was found that when the sodium compounds employed therein are distributed on certain carriers during use, the desulfurizing action thereof can be improved still further. The carriers employed according to the invention providing such improved desulfurizing action are mixtures of carbon, preferably, graphite, and an alkaline earth metal oxide or alkaline earth metal oxides including magnesium oxide. Preferably, calcium oxide is employed as the alkaline earth metal oxide component. The ratio of the oxide component to the carbon component in the mixed carriers employed according to the invention should be between 5:1 to 1:5 and, preferably, about 1.5:1 by weight. Such mixed carrier is mixed with the sodium compound. The preferred mixing ratio is about 1:1. Naturally, however, other mixing ratios may also be effectively employed. The proportion of the carrier employed, however, should not be so low that sintering of the desulfurizing composition (sodium compound+carrier) occurs during use. The upper limit for the proportion of the carrier is provided by the sulfur take up capacity of the desulfurizing composition. Expediently the ratio of sodium compound to carrier is between 9:1 and 1:9 by weight. Preferably the intimate mixture of the sodium compound and the mixed carrier is used in the form of shaped bodies, such as spheres, cylinders, tablets and the like, produced by compression molding or extrusion or, preferably, granulated products produced therefrom of an average grain size of about 2 to 10 mm.

The advantage of the desulfurizing composition according to the invention, in addition to the already mentioned improvement in desulfurizing action resides in the greater heat conductvity thereof as well as the higher capacity for taking up sulfur engendered by the alkaline earth metal oxide component. As a consequence, heat accumulations in the reaction bed are avoided and the desulfurizing action of the sodium compounds as well as of the alkaline earth metal oxide is fully utilized. In addition, the desulfurizing compositions according to the invention do not sinter during the reaction conditions to such an extent that they are impermeable to the hydrocarbon vapors.

The hydrocarbons to be purified are passed over the catalyst compositions according to the invention at higher temperatures of about 150 to 300° C. as described in Germany Patent 1,148,679 and U.S. Patent 3,160,580 whereby all types of organic sulfur compounds irregardless of constitution are removed.

DESCRIPTION OF PREFERRED EMBODIMENTS

The following examples will serve to illustrate the invention with reference to preferred embodiments thereof.

Example 1

Gasoline with an end boiling point of 140° C. and a sulfur content of 0.04 wt. percent was vaporized and passed at a temperature between 230 and 280° C. over a desulfurization mass composed of granulated compacts formed of an intimate finely divided mixture of 50 wt. percent of $Na_2O$, 30 wt. percent of CaO and 20 wt. percent of graphite. The sulfur content of the raffinates obtained after various periods of operation of the process was determined with the modified analyses method according to the principle of Granatelli (see Analyt. Chem. 319, pages 434–436, 1959, and Fuel, November 1964, pages 417–425) and are tabulated below.

| Period of operation in hours: | S content in p.p.m. |
|---|---|
| 2 | 0.03 |
| 50 | 0.04 |
| 100 | 0.02 |
| 200 | 0.03 |

Example 2

A predistilled benzene of a boiling range of 79–81° C. and a sulfur content of 0.05 wt. percent was heated analogously to Example 1. The analyses of the raffinates after various periods of operation are tabulated below.

| Period of operation in hours: | S content in p.p.m. |
|---|---|
| 2 | Not ascertainable |
| 50 | Not ascertainable |
| 100 | 0.01 |
| 200 | 0.01 |

I claim:
1. In a process for the desulfurization of hydrocarbons contaminated with organic sulfur compounds in the vapor phase by contact with a desulfurizing mass containing at least one finely divided sodium compound selected from the group consisting of sodium monoxide and sodium hydride at a temperature sufficiently high to effect reaction between the sodium compound and the contaminating sulfur compounds, the improvement of effect- ing such contact of the hydrocarbon vapors to be desulfurized with the finely divided sodium compound in the form of a uniform mixture with a mixed carrier essentially consisting of at least one alkaline earth metal oxide and graphite.

2. The process of claim 1 in which the mixture of the sodium compound and carrier contacted with the hydrocarbon vapors to be desulfurized is in the form of granules.

3. The process of claim 1 in which the alkaline earth metal oxide is calcium oxide.

4. The process of claim 3 in which the ratio of oxide to graphite is between 5:1 and 1:5 by weight.

5. The process of claim 1 wherein the alkaline earth metal oxide is selected from the group consisting of calcium oxide and magnesium oxide.

References Cited

UNITED STATES PATENTS

| | | | |
|---|---|---|---|
| 3,160,580 | 12/1964 | Achenbach et al. | 208—226 |
| 2,481,300 | 9/1949 | Engel | 208—226 |
| 1,807,924 | 6/1931 | Magill | 208—230 |
| 3,160,580 | 12/1964 | Achenbach | 208—226 |

DELBERT E. GANTZ, Primary Examiner

J. N. NELSON, Assistant Examiner